United States Patent Office 3,535,021
Patented Oct. 20, 1970

3,535,021
POLARIZATION CONTROLLED PHOTOCHROMIC "WRITE-IN" SYSTEM
Juan J. Amodei, Levittown, Pa., assignor to RCA Corporation, a corporation of Delaware
Filed May 13, 1968, Ser. No. 728,588
Int. Cl. G02f 3/00
U.S. Cl. 350—150    13 Claims

ABSTRACT OF THE DISCLOSURE

The disclosed invention relates to an optical circuit for "writing" upon a material having absorption characteristics which respond to the application of energy of different wavelengths, e.g., photochromics. Light beams of the desired wavelength are supplied which are subsequently operated upon by the circuitry in response to applied control signals to provide a desired end effect.

BACKGROUND OF THE INVENTION

Figure 1:
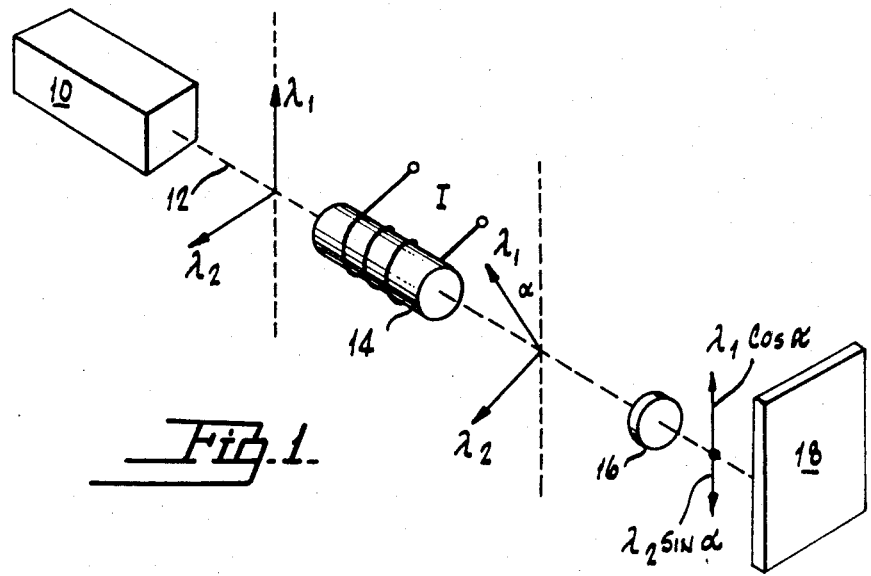

Many materials are known which respond in a predetermined manner upon the application thereto of energy exhibiting particular characteristics. This invention relates to those materials having absorption characteristics which are affected in a first manner upon the application thereto of energy of a first wavelength, and in a second manner upon the application thereto of energy of a second wavelength. The term "materials" as used hereafter in this application is so defined.

One example of such materials are photochromics which switch to a darkened state when light of a first particular wavelength is applied, and revert to their original state when light of a second particular wavelength is applied. Some examples of such photochromic materials include: alkaline earth titanates containing small quantities of transition metal ions, such as strontium titanate or calcium titanate, doped with either (a) iron and/or molybdenum, or (b) nickel and/or molybdenum; sodalite, preferably containing small quantities of transition metal ions, such as sodalite doped with iron; alkaline earth fluorides containing small amounts of divalent rare earth ions, such as calcium fluoride doped with cerium, lanthanum, gadolinium or terbium; and molybdenum trioxide.

In addition, there are materials of the alkali halide group, such as potassium chloride and cesium iodide for example, which switch to a darkened state when stimulated by light of a first particular wavelength, and revert to their original or "bleached" state as a result of thermal agitation caused by the application thereto of energy which may be applied in the form of light of a predetermined wavelength.

In the past, when it was desirable to darken or "write" upon such a material, a first energy source of the first particular wavelength required was applied to the material and the degree of darkening controlled by the intensity of the applied energy. To bleach or "erase" the material, a second energy source of the second particular frequency required was applied in a similar manner.

SUMMARY OF THE INVENTION

This invention relates to apparatus and techniques for more efficiently and effectively controlling the condition of a material which responds in a predetermined manner upon the application thereto of energy of particular wavelengths. More particularly, it relates to apparatus and techniques for writing upon and bleaching materials which are darkened in various degrees by the application thereto of energy of varying intensity of a first wavelength and which are lightened in various degrees by the application thereto of energy of varying intensity of a second wavelength.

In accordance with the present invention, apparatus for selectively controlling the condition of such a material comprises means for providing polarized light beams of first and second wavelengths, said beams having a predetermined phase relationship with respect to each other, said first wavelength affecting said material in a first manner, said second wavelength affecting said material in a second manner; means for selectively modifying the polarization of said beams; and filtering means disposed intermediate said modifying means and said material, said filtering means oriented to permit selected portions of said modified beams to pass therethrough, said selected portions serving to irradiate said material and control its condition in response thereto.

The invention further includes a method for controlling the condition of such a material wherein the steps comprise applying first and second beams of light to a magneto-optic or electro-optic device, said beams being polarized in a predetermined manner relative to each other, the wavelength of said first beam of light corresponding to the wavelength required to darken said material, the wavelength of said second beam of light corresponding to the wavelength required to bleach said material; modifying the polarization of said beams of light in response to a predetermined signal applied to said magneto-optic or electro-optic device; passing said modified beams through a polarization analyzer which selectively absorbs portions thereof; and irradiating said material with the unabsorbed portions of said beams, whereby said material is darkened or bleached in response to the application of the transmitted portions of said beams.

The novel features which are considered characteristic of the present invention are set forth in the appended claims. The invention itself, both as to its organization and method of operation, as well as the objects and advantages thereof, will be best understood by reading the following description in conjunction with the accompanying drawing, which is illustrative of a preferred embodiment thereof.

DESCRIPTION OF THE PREFERRED EMBODIMENT

Turning now to a description of the preferred embodiment of the present invention as disclosed in FIG. 1, a source of energy is provided which is capable of supplying light beams of the proper wavelengths required to darken and lighten the material to be affected. In FIG. 1 a single laser 10 is depicted which is capable of simultaneously emitting energy in the form of light beams 12 exhibiting two wavelengths ($\lambda_1$, $\lambda_2$); for example, an argon laser which emits beams of light exhibiting wavelength characteristics of 4579 A. and 5145 A. Such a laser was selected because the forementioned wavelengths correspond to those required to darken and bleach a sample of strontium titanate ($SrTiO_3$) doped with iron and molybdenum, which was chosen as the material to be affected. Where a material is chosen which will only respond to wavelengths which are not simultaneously available from a single laser, separate energy sources, e.g., lasers, may be used.

Figure 2:
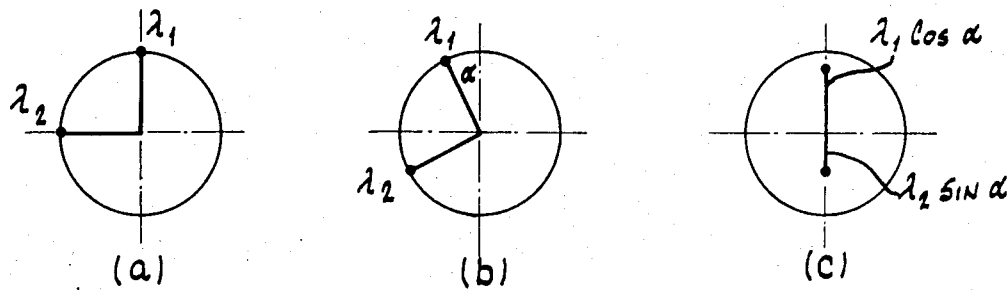

The beams of light 12 emitted by the laser 10 are arranged such that they are polarized in a predetermined manner relative to each other. As shown in FIGS. 1 and 2a, the beams are depicted as being linearly polarized at right angles to each other. Where a single laser source capable of simultaneously emitting dual beams of light of differing wavelengths is used this may be accomplished internally, i.e., within the laser, or externally. Where two separate lasers are used the relative polarization may be easily arranged by proper orientation of the polarization determining elements in the two cavities.

The polarized beams are then applied to either a magneto-optic or an electro-optic device 14, to which a control signal I may be applied. An example of the former would be a Faraday rotator; examples of the latter include Pockel and Kerr cells. These devices are well known to those skilled in the art and a detailed explanation of their operation is omitted so as not to hinder the reader in understanding the present invention.

FIG. 1 embodies a magneto-optic device 14 and the invention will be described in light thereof. The use of an electro-optic device will result in substantially the same ultimate effects although the operation within the device will differ from the operation within the magneto-optic device. This will be evident to those skilled in the art as a result of the well appreciated phenomenon which occurs within an electro-optic device whereby the transmitted beams would not remain linearly polarized, but rather, in general would be elliptically polarized.

In the absence of the application of a control signal I to the magneto-optic device 14 depicted in FIG. 1, the polarized beams will emerge therefrom substantially unaffected. The application of a signal I of predetermined value to the device 14 however, as the polarized beams are passed therethrough will cause the beams to rotate through an angle of polarization $\alpha$, said angle of polarization being dependent upon the nature of the signal applied to the device. FIG. 2b illustrates the effect upon the polarized beams represented in FIG. 2a after they have been passed through the magneto-optic device to which a signal has been applied.

The rotated polarized beams are then passed through a polarization analyzer 16 oriented to permit the passage therethrough of light polarized in one direction only. Assuming the reference plane of the analyzer 16 corresponds to the reference plane of the original polarized beams 12 this would permit the passage of only the vertical components of the rotated beams, i.e., $\lambda_1 \cos \alpha$; $\lambda_2 \sin \alpha$, as shown in FIG. 2c.

These transmitted components are then applied to the material 18, i.e. ($SrTiO_3$), causing it to change its condition in response thereto. By controlling the angle of polarization $\alpha$ via the signal I applied to the magneto-optic device the net effect of the transmitted energy upon the material can be controlled to produce maximum darkness, maximum bleaching, or any degree of darkening or bleaching intermediate these maximums. In FIG. 2c, assuming that $\lambda_1$ was the "writing" or darkening wavelength, and $\lambda_2$ was the "bleaching" or lightening wavelength, the net effect of the transmitted light would be to darken the material.

What is claimed is:

1. Apparatus for selectively controlling the absorption characteristics of a material, the absorption characteristics of said material being responsive to the application of energy of a first wavelength to said material in a manner to darken said material and, to the application thereto of energy of a second wavelength in a manner to bleach said material, said apparatus comprising:
   (a) means for simultaneously providing energy beams of said first and second wavelengths, said beams polarized in a predetermined manner relative to each other;
   (b) means for selectively modifying the polarization of said beams; and
   (c) filtering means disposed intermediate said modifying means and said material, said filtering means oriented to permit selected components of said modified beams to pass therethrough, said selected components serving to irradiate said material and control its condition in response thereto.

2. Apparatus for selectively controlling the condition of a photochromic material comprising:
   (a) means for simultaneously providing light beams of first and second wavelengths, said beams being linearly polarized and having a predetermined angular displacement with respect to each other,
       said first wavelength corresponding to the wavelength required to darken the photochromic,
       said second wavelength corresponding to the wavelength required to bleach photochromic;
   (b) means for selectively modifying the polarization of said beams; and
   (c) filtering means disposed between said modifying means and the material, said filtering means oriented to pass selected components of said modified first and second light beams, said selected components serving to irradiate the material and control its condition.

3. Apparatus for selectively controlling the condition of a photochromic material as described in claim 2 wherein said first named means includes a single laser which generates light beams of said first and second wavelengths, said light beams serving as the source for the linearly polarized beams provided by said first named means.

4. Apparatus for selectively controlling the condition of a photochromic material as described in claim 2 wherein said modifying means comprises a magneto-optic device to which a signal may be applied to change the polarization of said beams.

5. Apparatus for selectively controlling the condition of a photochromic material as described in claim 2 wherein said modifying means comprises an electro-optic device to which a signal may be applied to change the polarization of said beams.

6. Apparatus for selectively controlling the condition of a material as described in claim 2 wherein said filtering means comprises a polarization analyzer.

7. In combination,
   (a) a photochromic material;
   (b) means for simultaneously providing beams of energy of first and second wavelengths, said beams polarized in a predetermined manner relative to each other,
       said first wavelength corresponding to the wavelength required to darken said photochromic material,
       said second wavelength corresponding to the wavelength required to bleach said photochromic material;
   (c) means for selectively rotating said beams through an angle of polarization in response to the application thereto of a predetermined signal: and
   (d) a polarization analyzer disposed intermediate said rotating means and said material, said analyzer oriented to permit selected components of said rotated beams to pass therethrough in accordance with the angle of polarization thereof, said selected components serving to irradiate said material and control its condition in response thereto.

8. The combination defined in claim 7 wherein said first named means includes a single laser which generates beams of energy of said first and second wavelengths, said beams serving as the source for the polarized beams provided by said first named means.

9. The combination defined in claim 7 wherein said rotating means comprises a magneto-optic device.

10. The combination defined in claim 7 wherein said rotating means comprises an electro-optic device.

11. A method for selectively controlling the condition of a material having absorption characteristics which are affected in a first manner to darken said material upon the application thereto of light of a first wavelength and in a second manner to bleach said material upon the application thereto of light of a second wavelength, comprising the steps of:
   (a) simultaneously applying first and second beams of light to a light rotating device, said beams polarized in a predetermined manner relative to each other, the wavelength of said first beam of light corresponding to the wavelength required to affect the absorption characteristics of the material in said first manner, the wavelength of said second beam of light corresponding to the wavelength required to affect the absorption characteristics of the material in said second manner;

(b) rotating said polarized beams of light in response to a predetermined signal applied to said device;

(c) passing said rotated beams through a polarization analyzer which selectively transmits components thereof; and (d) irradiating said material with the transmitted components of said beams, whereby the absorption characteristic displayed by said material is determined by the transmitted components of said beams.

12. A method for selectively controlling the condition of a photochromic material, comprising the steps of:

(a) simultaneously applying first and second energy beams to an electro-optic device, said beams polarized in a predetermined manner with respect to each other, the wavelength of said first beam corresponding to the wavelength required to darken the photochromic, the wavelength of said second beam corresponding to the wavelength required to bleach the photochromic;

(b) modifying said polarized beams in response to a predetermined signal applied to said electro-optic device to cause said beams to rotate through an angle of polarization;

(c) passing said modified beams through a polarization analyzer which selectively transmits components thereof in accordance with said angle of polarization; and (d) irradiating said material with the transmitted components of said beams, whereby the condition of the material irradiated is determined by the transmitted components of said beams.

13. A method for selectively controlling the condition of a photochromic material, comprising the steps of:

(a) simultaneously applying first and second linearly polarized beams of light to a magneto-optic device, said beams being orthogonally displaced with respect to each other, the wavelength of said first beam of light corresponding to the wavelength required to darken said photochromic material, the wavelength of said second beam of light corresponding to the wavelength required to bleach said photochromic material;

(b) rotating said orthogonally polarized beams of light in response to a predetermined signal applied to said magneto-optic device;

(c) passing said rotated beams through a polarization analyzer oriented to selectively transmit components thereof; and (d) irradiating said photochromic material with said transmitted components, whereby said photochromic is darkened or bleached in response to the application of the transmitted components of said beams.

References Cited

UNITED STATES PATENTS

| | | | |
|---|---|---|---|
| 3,200,410 | 8/1965 | Frungel | 350—150 X |
| 3,272,988 | 9/1966 | Bloom et al. | 350—151 X |
| 3,417,381 | 12/1968 | Sincerbox. | |

DAVID SCHONBERG, Primary Examiner

P. R. MILLER, Assistant Examiner

U.S. Cl. X.R.

350—151, 160